United States Patent
Ravi et al.

(10) Patent No.: US 8,505,625 B2
(45) Date of Patent: Aug. 13, 2013

(54) CONTROLLING WELL OPERATIONS BASED ON MONITORED PARAMETERS OF CEMENT HEALTH

(75) Inventors: Kris Ravi, Kingwood, TX (US); Etienne M. Samson, Houston, TX (US); John L. Maida, Jr., Houston, TX (US); William Hunter, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 249 days.

(21) Appl. No.: 12/816,749

(22) Filed: Jun. 16, 2010

(65) Prior Publication Data

US 2011/0308788 A1  Dec. 22, 2011

(51) Int. Cl.
*E21B 47/12* (2012.01)
*E21B 49/00* (2006.01)

(52) U.S. Cl.
USPC .................................. 166/250.14; 166/253.1

(58) Field of Classification Search
USPC ....... 166/250.01, 66, 242.1, 65.1; 73/152.46, 73/152.36, 152.45, 152.33, 152.21, 152.18; 250/256
See application file for complete search history.

(56) References Cited

U.S. PATENT DOCUMENTS

| | | | |
|---|---|---|---|
| 2,210,417 A | 8/1940 | Kinley | |
| 2,242,161 A | 5/1941 | Athy et al. | |
| 2,739,475 A | 3/1956 | Nowak | |
| 2,803,526 A | 8/1957 | Nowak | |
| 3,480,079 A | 11/1969 | Guinn et al. | |
| 3,854,323 A | 12/1974 | Hearn et al. | |
| 3,864,969 A | 2/1975 | Smith, Jr. | |
| 4,046,220 A | 9/1977 | Glenn, Jr. | |
| 4,120,166 A * | 10/1978 | Brooks, Jr. .................... | 405/225 |
| 4,191,250 A * | 3/1980 | Messenger ................ | 166/253.1 |
| 4,208,906 A | 6/1980 | Roberts, Jr. | |
| 4,330,037 A | 5/1982 | Richardson et al. | |
| 4,410,041 A | 10/1983 | Davies et al. | |
| 4,520,666 A | 6/1985 | Coblentz et al. | |
| 4,575,260 A | 3/1986 | Young | |
| 4,641,028 A | 2/1987 | Taylor et al. | |
| 4,703,175 A | 10/1987 | Salour et al. | |

(Continued)

FOREIGN PATENT DOCUMENTS

| CA | 2320394 A1 | 4/2001 |
|---|---|---|
| CA | 2626596 C | 4/2009 |

(Continued)

OTHER PUBLICATIONS

Partial Search Report issued Apr. 7, 2011 for International application No. PCT/GB2010/001949, 5 pages.

(Continued)

*Primary Examiner* — Kenneth L Thompson
(74) *Attorney, Agent, or Firm* — Smith IP Services, P.C.

(57) ABSTRACT

A method of controlling a well operation can include monitoring at least one parameter of cement lining a wellbore, the monitoring being performed via at least one optical waveguide, and modifying the well operation in response to the parameter being outside of a predetermined acceptable range. A well monitoring system can include at least one optical waveguide which is used to sense at least one parameter of cement lining a wellbore, an optical interrogation system optically connected to the at least one optical waveguide, and a control system which controls operation of at least one item of well equipment in response to information received from the optical interrogation system.

33 Claims, 8 Drawing Sheets (56) References Cited

U.S. PATENT DOCUMENTS

| | | | |
|---|---|---|---|
| 4,714,342 A | 12/1987 | Jackson et al. | |
| 4,832,121 A | 5/1989 | Anderson | |
| 4,927,232 A * | 5/1990 | Griffiths | 385/13 |
| 4,976,142 A | 12/1990 | Perales | |
| 5,026,141 A * | 6/1991 | Griffiths | 385/13 |
| 5,163,321 A | 11/1992 | Perales | |
| 5,182,779 A | 1/1993 | D'Agostino et al. | |
| 5,194,847 A | 3/1993 | Taylor et al. | |
| 5,249,251 A | 9/1993 | Egalon et al. | |
| 5,271,675 A | 12/1993 | Fagan et al. | |
| 5,326,969 A | 7/1994 | Fagan et al. | |
| 5,377,160 A * | 12/1994 | Tello et al. | 367/35 |
| 5,380,995 A | 1/1995 | Udd et al. | |
| 5,451,772 A | 9/1995 | Narendran | |
| 5,488,224 A | 1/1996 | Fagan et al. | |
| 5,509,474 A | 4/1996 | Cooke, Jr. | |
| 5,557,406 A | 9/1996 | Taylor et al. | |
| 5,641,956 A | 6/1997 | Vengsarkar et al. | |
| 5,862,273 A | 1/1999 | Pelletier | |
| 5,892,860 A | 4/1999 | Maron et al. | |
| 6,004,639 A | 12/1999 | Quigley et al. | |
| 6,041,860 A | 3/2000 | Nazzal et al. | |
| 6,082,454 A | 7/2000 | Tubel | |
| 6,125,935 A * | 10/2000 | Shahin, Jr. | 166/250.14 |
| 6,233,374 B1 | 5/2001 | Ogle et al. | |
| 6,233,746 B1 | 5/2001 | Skinner | |
| 6,268,911 B1 | 7/2001 | Tubel et al. | |
| 6,279,392 B1 * | 8/2001 | Shahin et al. | 73/152.52 |
| 6,281,489 B1 | 8/2001 | Tubel et al. | |
| 6,354,147 B1 | 3/2002 | Gysling et al. | |
| 6,380,534 B1 | 4/2002 | Farhadiroushan et al. | |
| 6,408,943 B1 | 6/2002 | Schultz et al. | |
| 6,422,084 B1 | 7/2002 | Fernald et al. | |
| 6,437,326 B1 | 8/2002 | Yamate et al. | |
| 6,531,694 B2 | 3/2003 | Tubel et al. | |
| 6,555,807 B2 | 4/2003 | Clayton et al. | |
| 6,557,630 B2 | 5/2003 | Harkins et al. | |
| 6,588,266 B2 | 7/2003 | Tubel et al. | |
| 6,590,647 B2 | 7/2003 | Stephenson | |
| 6,618,677 B1 | 9/2003 | Brown | |
| 6,751,556 B2 | 6/2004 | Schroeder et al. | |
| 6,789,621 B2 | 9/2004 | Wetzel et al. | |
| 6,828,547 B2 | 12/2004 | Tubel et al. | |
| 6,834,233 B2 | 12/2004 | Economides et al. | |
| 6,847,034 B2 | 1/2005 | Shah et al. | |
| 6,913,079 B2 | 7/2005 | Tubel | |
| 6,913,083 B2 | 7/2005 | Smith | |
| 6,919,079 B1 | 7/2005 | Fishman et al. | |
| 6,920,395 B2 | 7/2005 | Brown | |
| 6,945,095 B2 * | 9/2005 | Johansen | 73/61.45 |
| 6,957,574 B2 | 10/2005 | Ogle | |
| 6,977,367 B2 | 12/2005 | Tubel et al. | |
| 6,978,832 B2 | 12/2005 | Gardner et al. | |
| 6,981,549 B2 | 1/2006 | Morales et al. | |
| 6,992,048 B2 | 1/2006 | Reddy et al. | |
| 6,997,256 B2 | 2/2006 | Williams et al. | |
| 7,000,696 B2 | 2/2006 | Harkins | |
| 7,006,918 B2 | 2/2006 | Economides et al. | |
| 7,021,146 B2 | 4/2006 | Nash et al. | |
| 7,040,390 B2 | 5/2006 | Tubel et al. | |
| 7,055,604 B2 | 6/2006 | Jee et al. | |
| 7,066,284 B2 | 6/2006 | Wylie et al. | |
| 7,086,484 B2 | 8/2006 | Smith, Jr. | |
| 7,140,435 B2 | 11/2006 | Defretin et al. | |
| 7,140,437 B2 | 11/2006 | McMechan et al. | |
| 7,159,468 B2 | 1/2007 | Skinner et al. | |
| 7,163,055 B2 | 1/2007 | Coon et al. | |
| 7,168,311 B2 | 1/2007 | Zisk, Jr. et al. | |
| 7,182,134 B2 | 2/2007 | Wetzel et al. | |
| 7,219,729 B2 | 5/2007 | Bostick, III et al. | |
| 7,219,730 B2 | 5/2007 | Tilton et al. | |
| 7,245,791 B2 | 7/2007 | Rambow et al. | |
| 7,255,173 B2 * | 8/2007 | Hosie et al. | 166/332.8 |
| 7,282,697 B2 | 10/2007 | Thomas et al. | |
| 7,328,624 B2 | 2/2008 | Gysling et al. | |
| 7,345,953 B2 | 3/2008 | Crickmore et al. | |
| 7,357,021 B2 | 4/2008 | Blacklaw | |
| 7,398,680 B2 | 7/2008 | Glasbergen et al. | |
| 7,409,858 B2 | 8/2008 | Dria et al. | |
| 7,430,903 B2 | 10/2008 | Ramos | |
| 7,441,605 B2 * | 10/2008 | Coronado et al. | 166/313 |
| 7,458,273 B2 | 12/2008 | Skinner et al. | |
| 7,511,823 B2 | 3/2009 | Schultz et al. | |
| 7,529,434 B2 | 5/2009 | Taverner et al. | |
| 7,730,774 B2 | 6/2010 | Glasbergen et al. | |
| 7,779,683 B2 | 8/2010 | Glasbergen et al. | |
| 7,997,340 B2 * | 8/2011 | Bostick et al. | 166/250.01 |
| 2002/0040963 A1 | 4/2002 | Clayton et al. | |
| 2002/0060070 A1 * | 5/2002 | Ramos et al. | 166/285 |
| 2002/0064331 A1 | 5/2002 | Davis et al. | |
| 2002/0179301 A1 | 12/2002 | Schultz et al. | |
| 2003/0094281 A1 | 5/2003 | Tubel | |
| 2003/0166470 A1 | 9/2003 | Fripp et al. | |
| 2003/0205083 A1 | 11/2003 | Tubel et al. | |
| 2003/0236626 A1 | 12/2003 | Schroeder et al. | |
| 2004/0040707 A1 | 3/2004 | Dusterhoft et al. | |
| 2004/0084180 A1 | 5/2004 | Shah et al. | |
| 2004/0109228 A1 | 6/2004 | Aronstam | |
| 2004/0113104 A1 * | 6/2004 | Maida, Jr. | 250/573 |
| 2005/0120796 A1 | 6/2005 | Nash et al. | |
| 2005/0149264 A1 | 7/2005 | Tarvin et al. | |
| 2006/0010973 A1 | 1/2006 | Brown | |
| 2006/0109746 A1 | 5/2006 | Crickmore et al. | |
| 2006/0133203 A1 | 6/2006 | James et al. | |
| 2007/0120051 A1 | 5/2007 | DiFoggio et al. | |
| 2007/0234786 A1 | 10/2007 | Tarvin | |
| 2007/0234788 A1 | 10/2007 | Glasbergen et al. | |
| 2007/0234789 A1 | 10/2007 | Glasbergen et al. | |
| 2008/0068586 A1 | 3/2008 | Kishida et al. | |
| 2008/0088846 A1 | 4/2008 | Hayward et al. | |
| 2008/0134775 A1 | 6/2008 | Pipchuk et al. | |
| 2008/0181554 A1 | 7/2008 | Taverner et al. | |
| 2008/0236836 A1 | 10/2008 | Weng | |
| 2008/0273852 A1 * | 11/2008 | Parker et al. | 385/128 |
| 2009/0114386 A1 | 5/2009 | Hartog et al. | |
| 2011/0030467 A1 | 2/2011 | Bakulin | |
| 2011/0088462 A1 | 4/2011 | Samson et al. | |
| 2011/0090496 A1 | 4/2011 | Samson et al. | |
| 2012/0013893 A1 * | 1/2012 | Maida et al. | 356/73.1 |
| 2012/0018167 A1 | 1/2012 | Konopczynski et al. | |
| 2012/0132417 A1 * | 5/2012 | Dria et al. | 166/250.01 |

FOREIGN PATENT DOCUMENTS

| | | |
|---|---|---|
| EP | 1464204 A1 | 12/2002 |
| EP | 0910725 B1 | 7/2003 |
| EP | 1355166 A2 | 10/2003 |
| EP | 1355169 A2 | 10/2003 |
| EP | 1357401 A2 | 10/2003 |
| EP | 1468258 A2 | 10/2004 |
| EP | 1464204 B1 | 4/2005 |
| EP | 1563323 B1 | 3/2007 |
| EP | 1466138 B1 | 4/2009 |
| EP | 1468258 B1 | 4/2010 |
| GB | 2230086 A | 10/1990 |
| GB | 2354782 A | 4/2001 |
| GB | 2362462 A | 11/2001 |
| GB | 2364380 A | 1/2002 |
| GB | 2364381 A | 1/2002 |
| GB | 2364384 A | 1/2002 |
| GB | 2367890 A | 4/2002 |
| GB | 2384108 A | 7/2003 |
| GB | 2384313 A | 7/2003 |
| GB | 2384644 A | 7/2003 |
| GB | 2386625 A | 9/2003 |
| GB | 2386687 A | 9/2003 |
| GB | 2397648 A | 7/2004 |
| GB | 2408327 A | 5/2005 |
| GB | 2408328 A | 5/2005 |
| GB | 2408329 A | 5/2005 |
| GB | 2408531 A | 6/2005 |
| SU | 1294985 A1 | 3/1987 |
| WO | 03021301 A2 | 3/2003 |
| WO | 03059009 A1 | 7/2003 |
| WO | 03062750 A1 | 7/2003 |

| | | |
|---|---|---|
| WO | 03062772 A2 | 7/2003 |
| WO | 03081186 A2 | 10/2003 |
| WO | 03062772 A3 | 12/2003 |
| WO | 03081186 A3 | 12/2003 |
| WO | 03106940 A1 | 12/2003 |
| WO | 2004001356 A2 | 12/2003 |
| WO | 2004020789 A2 | 3/2004 |
| WO | 2004020790 A2 | 3/2004 |
| WO | 2004042425 A1 | 5/2004 |
| WO | 2004042425 A8 | 8/2004 |
| WO | 2004076815 A1 | 9/2004 |
| WO | 2004081509 A1 | 9/2004 |
| WO | 2004085795 A1 | 10/2004 |
| WO | 2004094961 A1 | 11/2004 |
| WO | 2004114487 A1 | 12/2004 |
| WO | 2005035943 A1 | 4/2005 |
| WO | 2005064117 A1 | 7/2005 |
| WO | 2005116388 A1 | 12/2005 |
| WO | 2008098380 A1 | 8/2008 |
| WO | 2008119951 A2 | 10/2008 |
| WO | 2008119951 A3 | 11/2009 |
| WO | 2010020781 A1 | 2/2010 |
| WO | 2010020795 A1 | 2/2010 |
| WO | 2010020796 A1 | 2/2010 |

OTHER PUBLICATIONS

International Search Report and Written Opinion issued Aug. 19, 2010, for International Patent Application No. PCT/10/024100, 14 pages.
International Search Report with Written Opinion issued Jul. 4, 2011 for International Patent Application No. PCT/GB2010/001949, 15 pages.
Carnahan, B.D.; Clanton, R.W.; Koehler, K.D.; Harkins, G.O.; and Williams, G.R.; Fiber Optic Temperature Monitoring Technology, SPE 54599; May 26-28, 1999; Anchorage, AK, US.
Saputelli, L.; Mendoza, H.; Finol, J.; Rojas, L.; Lopez, E.; Bravo, H.; and Buitriago, S.; Monitoring Steamflood Performance through Fiber Optic Temperature Sensing, SPE 54104; Mar. 17-19, 1999; Bakersfield, CA, US.
Karaman, O.; Kutlik, R.; and Kluth, E.; A Field Trial to Test Fiber Optic Sensors for Downhole Temperature and Measurements, West Coalinga Field, California, SPE 35685; May 22-24, 1996; Anchorage, AK, US.
Botto, G.; Maggioni, B.; and Schenato, A.; Electronic, Fiber-Optic Technology: Future Options for Permanent Reservoir Monitoring, SPE 28484; Sep. 25-28, 1994; New Orleans, LA, US.
Bjornstad, B.; Kvisteroy, T.; and Eriksrud, M.; Fibre Optic Well Monitoring System, SPE 23147; Sep. 3-6, 1991; pp. 425-432; Aberdeen, UK.
International Search Report with Written Opinion issued Aug. 19, 2010, for US Patent Application Serial No. PCT/US10/024100, 14 pages.
Office Action issued Dec. 10, 2009, for U.S. Appl. No. 11/398,503, 8 pages.
Office Action issued Nov. 29, 2007, for U.S. Appl. No. 11/398,483, 20 pages.
Office Communication issued Dec. 10, 2007, for U.S. Appl. No. 11/398,483, 3 pages.
Office Action issued Sep. 26, 2008, for U.S. Appl. No. 11/398,503, 23 pages.
Office Action issued Apr. 14, 2009, for U.S. Appl. No. 11/398,503, 9 pages.
Office Action issued Jan. 12, 2010, for U.S. Appl. No. 12/167,884, 16 pages.
Office Action issued Jan. 13, 2010, for U.S. Appl. No. 12/167,910, 16 pages.
Naotsugu Ikeda, "Fractured Reservoir Management by Fiber Optic Distributed Temperature Measurement," Sep. 27-28, 2000, 6 pages.
John Fagley, H.S. Fogler, C.B. Davenport, and R.S. Millhone, "An Improved Simulation for Interpreting Temperature Logs in Water Injection Wells," SPE 10081, Oct. 1982, 10 pages.
R.N. Horne, J.L. Perrick, and J. Barua, "The Use of Microcomputers in Well Test Data Acquisition and Analysis," SPE 15308, Jun. 18-20, 1986, SilverCreek, CO, 9 pages.

M.Y. Soliman, "Technique for Considering Fluid Compressibility and Temperature Changes in Mini-Frac Analysis," SPE 15370, Oct. 5-8, 1986, New Orleans, LA, 11 pages.
W.S. Lee, "Study of the Effects of Fluid Rheology on Minifrac Analysis," SPE 16916, Sep. 27-30, 1987, Dallas, TX, 10 pages.
B. Bjornstad, T. Kvisteroy, and M. Eriksrud, "Fibre Optic Well Monitoring System," SPE 23147, Sep. 3-6, 1991, Aberdeen, 8 pages.
M.P. Cleary, D.E. Johnson, H.H. Kogsboll, K.A. Owens, K.F. Perry, C.J. de Pater, A. Stachel, H. Schmidt, and M. Tambini, "Field Implementation of Proppant Slugs to Avoid Premature Screen-Out of Hydraulic Fractures with Adequate Proppant Concentration," SPE 25892, Apr. 12-14, 1993, Denver, CO, 16 pages.
G. Botto, B. Maggioni and A. Schenato, "Electronic, Fiber-Optic Technology: Future Options for Permanenet Reservoir Monitoring," SPE 28484, Sep. 25-28, 1994, New Orleans, LA, 10 pages.
O.S. Karaman, R.L. Kutlik, and E.L. Kluth, "A Field Trial to Test Fiber Optic Sensors for Downhole Temperature and Pressure Measurements, West Coalinga Field, California," SPE 35685, May 22-24, 1996, Anchorage, AK, 7 pages.
L. Saputelli, H. Mendoza, J. Finol, L. Rojas, E. Lopez, H. Bravo, and S. Buitriago, "Monitoring Steamflood Performance through Fiber Optic Temperature Sensing," SPE 54104, Mar. 17-19, 1999, Bakersfield, CA, 7 pages.
B.D. Carnahan, R.W. Clanton, K.D. Koehler, G.O. Harkins, and G.R. Williams, "Fiber Optic Temperature Monitoring Technology," SPE 54599, May 26-28, 1999, Anchorage, AK, 10 pages.
Klas Eriksson, "Fiber Optic Sensing—Case of 'Solutions Looking for Problems'," SPE 71829, Aberdeen, Scotland, Sep. 4-7, 2001, 5 pages.
D. Callison, J. Jones, B. Shelley, and R. Lockman, "Integrated Modeling of a Field of Wells—An Evaluation of Western Shallow Oil Zone Completion Practices in the Elk Hills Field, Kern County, California," SPE 76724, Anchorage, AK, May 20-22, 2002, 10 pages.
G. Corbett, E. Fagervik, S. Christie, B. Smith, and K. Falcon, "Fiber Optic Monitoring in Openhole Gravel Pack Completions," SPE 77682, San Antonio, TX, Sep. 29-Oct. 2, 2002, 14 pages.
G.A. Brown, and A. Hartog, "Optical Fiber Sensors in Upstream Oil & Gas," SPE 79080, 2002, 3 pages.
G. Brown, D. Storer, K. McAllister, M. al-Asimi, and K. Raghavan, "Monitoring Horizontal Producers and Injectors During Cleanup and Production Using Fiber-Optic-Distributed Temperature Measurements," SPE 84379, Oct. 5-8, 2003, Denver, CO, 6 pages.
D.O. Johnson, R. Sugianto, P.H. Mock, and C.H. Jones, "Identification of Steam-Breakthrough Intervals with DTS Technology," SPE 87631, Feb. 2004, 8 pages.
H. Foucault, D. Poilleux, A. Djurisic, M. Slikas, J. Strand, and R. Silva, "A Successful Experience for Fiber Optic and Water Shut Off on Horizontal Wells With Slotted Liner Completion in an Extra Heavy Oil Field," SPE 89405, Apr. 17-21, 2004, Tulsa, OK, 6 pages.
B. Hasebe, A. Hall, B. Smith, J. Brady, and P. Mehdizadeh, "Field Qualification of Four Multiphase Flowmeters on North Slope, Alaska," SPE 90037, Sep. 26-29, 2004, Houston, TX, 13 pages.
A. Bond, C. Blount, T. Kragas, and S. Mathias, "Use of a Fiber Optic Pressure/Temperature Gauge in an Exploration Well to Minimize Formation Damage Potential and Reduce Costs During Production Testing," SPE 90130, Sep. 26-29, 2004, Houston, TX, 10 pages.
L.B. Ouyang, and D. Belanger, "Flow Profiling via Distributed Temperature Sensor (DTS) System—Expectation and Reality," SPE 90541, Sep. 26-29, 2004, Houston, TX, 14 pages.
D. K. Nath, "Fiber Optics Used to Support Reservoir Remperature Surveillance in Duri Steamflood," SPE 93240, Apr. 5-7, 2005, Jakarta, Indonesia, 9 pages.
G. Glasbergen, D. van Batenburg, M. van Domelen, and R. Gdanski, "Field Validation of Acidizing Wormhole Models," SPE 94695, May 25-27, 2005, Scheveningen, The Netherlands, 11 pages.
G. Brown, V. Carvalho, A. Wray, A. Sanchez, and G. Gutierrez, "Slickline With Fiber-Optic Distributed Temperature Monitoring for Water-Injection and Gas Lift Systems Optimization in Mexico," SPE 94989, Jun. 20-23, 2005, Rio de Janeiro, Brazil, 10 pages.
K. Yoshioka, D. Zhu, A.D. Hill, P. Dawkrajai, and L.W. Lake, "A Comprehensive Model of Temperature Behavior in a Horizontal Well," SPE 95656, Oct. 9-12, 2005, Dallas, TX, 15 pages.

G. Gao, and Y. Jalali, "Interpretation of Distributed Temperature Data During Injection Period in Horizontal Wells," SPE 96260, Oct. 9-12, 2005, Dallas, TX, 8 pages.

V. Pimenov, G. Brown, V. Tertychnyi, A. Shandrygin, and Y. Popov, "Injectivity Profiling in Horizontal Wells Through Distributed Temperature Monitoring," SPE 97023, Oct. 9-12, 2005, Dallas, TX, 8 pages.

D.K. Nath, R. Sugianto, and D. Finley, "Fiber-Optic Distributed Temperature Sensing Technology Used for Reservoir Monitoring in an Indonesia Steam Flood," SPE 97912, Nov. 1-3, 2005, Calgary, Alberta, Canada, 10 pages.

R.W. Clanton, J.A. Haney, R. Pruett, C.L. Wahl, J.J. Goiffon, and D. Gualtieri, "Real-Time Monitoring of Acid Stimulation Using a Fiber-Optic DTS System," SPE 100617, May 8-10, 2006, Anchorage, AK, 10 pages.

International Preliminary Report on Patentability issued Aug. 25, 2011 for International Patent Application No. PCT/ US10/024100, 8 pages.

Kading, Horace, and Hutchins, John S., "Temperature Surveys; The Art of Interpretation," American Petroleum Institute Division of Production, Mar. 12-14, 1969, 20 pages, Paper No. 906-14-N, Lubbock, Texas.

Sakaguchi, Keiichi, and Matsushima, Nobuo, "Temperature Profile Monitoring in Geothermal Wells by Distributed Temperature Sensing Technique," Geothermal Resources Council Transactions, Oct. 1995, 4 pages, vol. 19, Geological Survey of Japan, Higashi, Tsukuba, Ibaraki, Japan.

Henninges, J., Zimmermann, G., Buttner, G., Schrotter, J., Erbas, K, and Huenges, E.,"Fibre-Optic Temperature Measurements in Boreholes," FKPE-Workshop, Oct. 23-24, 2003, 9 pages, Hannover, Germany.

Johnson, David O., and Van Domelen, Mary, "StimWatch Stimulation Monitoring Service," Halliburton 2006 Special Meritorious Award for Engineering Innovation, 2006, 4 pages, Houston, Texas.

Knott, Terry, "Wytch Farm Sees the Light," Offshore Engineer, Dec. 1, 2000, 7 pages, oilonline.com.

Kading, Horace, "Shut-in Temperature Profiles Tell Where the Water Went," The Oil and Gas Journal, May 13, 1968, pp. 77-79.

Schlumberger, Oilfield Glossary, Term "Joule-Thomson," 2006, 1 page.

Halliburton Reservoir Performance Monitoring, 2005, 2 pages.

Nowak, T.J., "The Estimation of Water Injection Profiles from Temperature Surveys," Petroleum Transactions, AIME, 1953, pp. 203-212, vol. 198.

Sakaguchi, Keiichi, and Matsushima, Nobuo, "Temperature Logging by the Distributed Temperature Sensing Technique During Injection Tests," Proceedings World Geothermal Congress, May 28-Jun. 10, 2000, pp. 1657-1661, Kyushu—Tohoku, Japan.

Grobwig, St., Graupner, A. Hurtig, E., Kuhn, K., and Trostel, A., "Distributed Fibre Optical Temperature Sensing Technique—A Variable Tool for Monitoring Tasks," 8th International Symposium on Temperature and Thermal Measurements in Industry and Science, Jun. 19-21, 2001, pp. 9-17.

Hurtig, E., Ache, B., Grobwig, S., and Hanel, K., "Fibre Optic Temperature Measurements: A New Approach to Determine the Dynamic Behaviour of the Heat Exchanging Medium Inside a Borehole Heat Exchanger," Terrastock 2000, 8th International Conference on Thermal Energy Storage, Aug. 28-Sep. 1, 2000, Stuttgart, Germany.

Ikeda, N., Uogata,K., Kawazoe, S., and Haruguchi, K., "Delineation of Fractured Reservoir by Transient Temperature Analysis Using Fiber Optic Sensor," Proceedings World Geothermal Congress, May 28-Jun. 10, 2000, pp. 2617-2621, Kyushu—Tohoku, Japan.

Halliburton, "The Impact of Wellbore Phenomena on Fluid Placement and Zonal Coverage", Gerard Glasbergen, Nov. 1-3, 2005, 9 pages.

Oxy Elk Hills, "Using Fiber Optics to Divert Acid on the Fly in the Monterey Shale", Ray Clanton, May 8-10, 2006, 46 pages.

Pruett Industries, "Fiber Optic Distributed Temperature Sensor 'DTS' ", dated at least as early as 2001, 51 pages.

Office Action issued Mar. 29, 2012 for U.S. Appl. No. 12/603,334, 53 pages.

Office Action issued Jan. 28, 2011, for U.S. Appl. No. 12/603,299, 44 pages.

Baker Hughes Press Release; Shell and Baker Hughes Pioneer Real-time Compaction Imaging System; Jun. 26, 2009; 2 pages; Houston, Texas.

Choi, K.N., Juarez, J.C., Taylor, H.F.; Distributed Fiber-Optic Pressure/Seismic Sensor for Low-Cost Monitoring of Long Perimeters; SPIE vol. 5090, E.M. Carapezza, ed. pp. 134-141; Apr. 2003; 10 pages; Orlando, Florida.

Photonics.com; Fiber Optic Intrusion Sensor Protects Perimeters; Photonics.com Feature Articles; Jan. 28, 2005; 2 pages; Laurin Publishing; Pittsfield, Massachusetts.

Thevenaz, Luc; Review & Progress in Distributed Fiber Sensing; Ecole Polytechnique Federale de Lausanne, Laboratory of Nanophotonics & Metrology; undated; 28 pages; Lausanne, Switzerland.

Nikles, Marc; Fibre Optic Distributed Scattering Sensing System: Perspectives and Challenges for High Performance Applications; [Reprinted from the proceedings of] SPIE publication vol. 6619, Third European Workshop on Optical Fibre Sensors; Jul. 4-6, 2007; 8 pages; Napoli, Italy.

Lobo Ribeiro, A. B., Eira, N., Sousa, J. M., Guerreiro, P. T. and Salcedo, A.R.; Multi-Point Fibre Optic Hot-Spot Network Integrated Into a High Power Transformer; SPIE vol. 6619, 66193V; 2007; 4 pages; Third European Workshop on Optical Fibre Sensors; Portugal.

Halliburton, Pinnacle Reservoir Monitoring; StimWatch® Stimulation Monitoring Service; H04481; Jun. 2010; 4 pages.

International Search Report with Written Opinion issued Nov. 8, 2012 for PCT Patent Application No. PCT/GB11/000907, 11 pages.

\* cited by examiner

CONTROLLING WELL OPERATIONS BASED ON MONITORED PARAMETERS OF CEMENT HEALTH

BACKGROUND

This disclosure relates generally to equipment utilized and operations performed in conjunction with a subterranean well and, in an example described below, more particularly provides for controlling well operations based on monitored parameters of cement in a well.

In the past, failure of cement in a well has typically been reacted to, rather than proactively prevented. In general, the greatest measure of failure prevention occurs during the planning and installation of the cement. If failure subsequently occurs, it is dealt with then, typically with expensive and time consuming repair operations, and even including abandonment of the well.

It will, therefore, be appreciated that significant benefits could be achieved by actively monitoring parameters of the cement and modifying well operations if needed to prevent, or at least mitigate, damage to the cement.

SUMMARY

In the disclosure below, a well monitoring system and associated method are provided which bring improvements to the art of preventing or mitigating damage to cement in a well. One example is described below in which an optical waveguide is used to monitor strain and other parameters of the cement. Another example is described below in which well equipment is controlled based on the monitored parameters of the cement.

In one aspect, the disclosure provides to the art a method of controlling a well operation. The method can include monitoring at least one parameter of cement lining a wellbore, with the monitoring being performed via at least one optical waveguide. The well operation may be modified in response to the parameter being outside of a predetermined acceptable range.

In another aspect, a well monitoring system is provided which can include at least one optical waveguide which is used to sense at least one parameter of cement lining a wellbore, an optical interrogation system optically connected to the optical waveguide, and a control system which controls operation of well equipment in response to information received from the optical interrogation system.

These and other features, advantages and benefits will become apparent to one of ordinary skill in the art upon careful consideration of the detailed description of representative examples below and the accompanying drawings, in which similar elements are indicated in the various figures using the same reference numbers.

BRIEF DESCRIPTION OF THE DRAWINGS

FIGS. 5A-8D are schematic illustrations of various configurations of optical waveguide positions relative to a casing in the well monitoring system.

DETAILED DESCRIPTION

Figure 1:
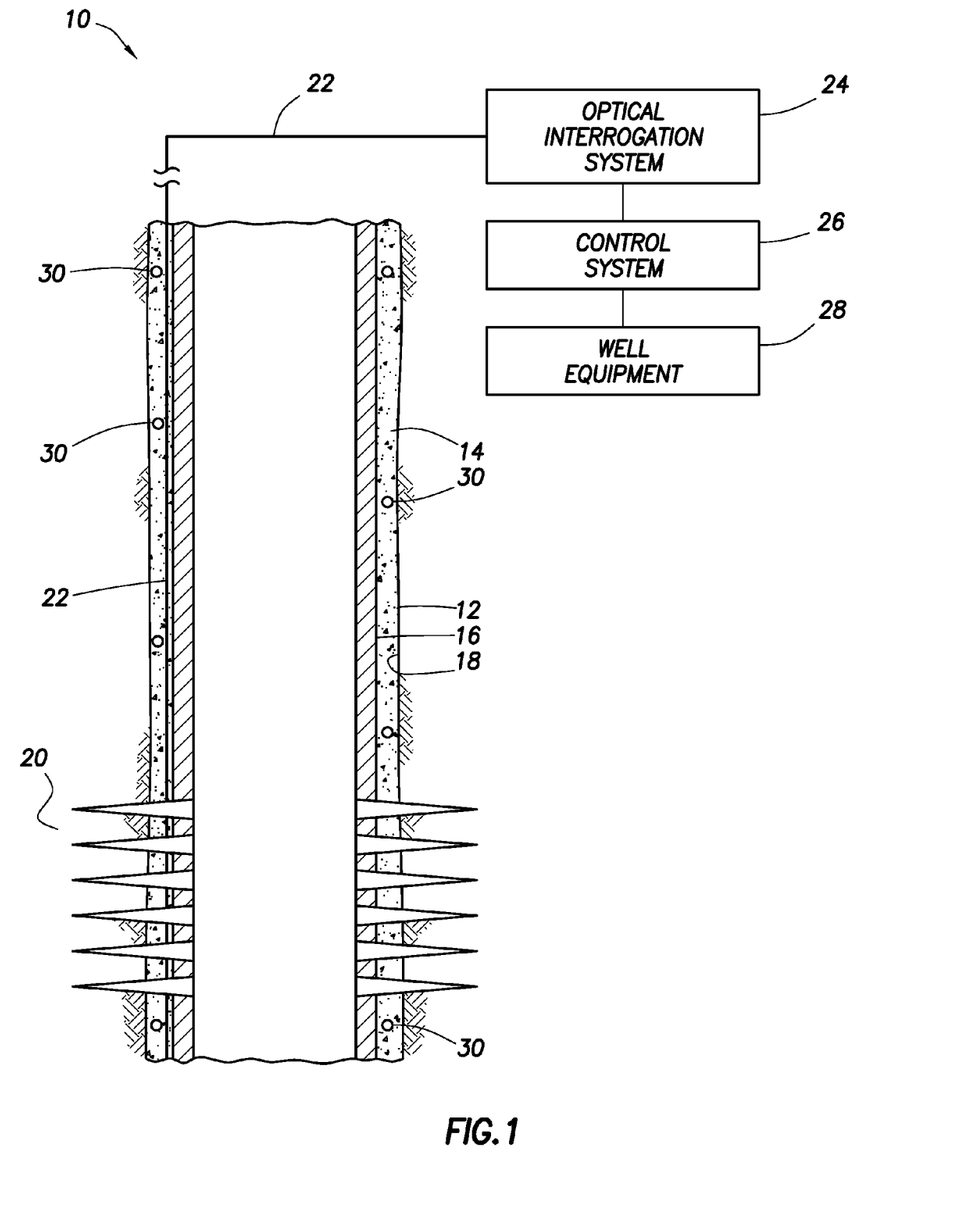
FIG. 1 is a schematic cross-sectional view of a well monitoring system and associated method which can embody principles of the present disclosure.

Representatively illustrated in FIG. 1 is a well monitoring system 10 and associated method which embody principles of this disclosure. In the system 10 as depicted in FIG. 1, cement 12 fills an annulus 14 formed radially between casing 16 and a wellbore 18.

As used herein, the term "cement" is used to indicate a hardenable material which is used to seal off an annular space in a well, such as the annulus 14. Cement is not necessarily cementitious, since other types of materials (e.g., polymers, such as epoxies, etc.) can be used in place of, or in addition to, a Portland type of cement. Cement can harden by hydrating, by passage of time, by application of heat, by cross-linking, and/or by any other technique.

As used herein, the term "casing" is used to indicate a generally tubular string which forms a protective wellbore lining. Casing may include any of the types of materials known to those skilled in the art as casing, liner or tubing. Casing may be segmented or continuous, and may be supplied ready for installation, or may be formed in situ.

In the system 10 of FIG. 1, the cement 12 forms a seal between the casing 16 and an earth formation 20 surrounding the wellbore 18. When initially installed, the cement 12 may have formed an effective seal, but subsequent well operations (such as pressure testing, well completion, stimulation, production, injection, etc.) can lead to compromising of the seal.

For example, the cement 12 can be stressed beyond its load limit and/or fatigue limit, leading to cracks in the cement. Cracks in the cement 12 can allow fluid to leak through or past the cement, thereby allowing fluid communication between zones which should be isolated from each other, allowing fluids to leak to the surface, etc. Loadings from compaction and subsidence can cause similar situations to develop.

The result of such failure can be lost production, as desirable well products flow to other zones or injected fluids flow to non-target zones, or undesired well effluents enter a production flow stream. This can cause the operator to initiate costly remedial actions to attempt to reestablish the annular seal, or in the worst case abandon a well that still has hydrocarbon reserves, or would otherwise be useful.

It is possible to determine the desirable mechanical properties of a hardened cement sheath that are needed to withstand predicted well stress events under a given set of well conditions. However, the future is uncertain, and the actual operational conditions of the well may not be predictable with a high level of accuracy.

As described below, the present disclosure provides a method of monitoring the actual distributed in situ static and dynamic strain to which a hardened cement sheath is subjected in real time during the life of a well. The onset of undesirable strain or other parameter at any stage is detected, and well operations are modified as needed to ameliorate the undesirable situation. This can prevent the load limitations of the cement 12 being exceeded, thereby preserving the well integrity and avoiding costly well failure.

For example, in a hydrocarbon well, the flow rate of fluids from the formation 20 into the wellbore 18 can be changed to reduce heat transfer to the annulus 14, and thereby reduce strain in the cement 12 due to excessive temperature increase. In an injection well, the rate of flow of fluid into the formation 20 can be changed to reduce strain due to pressure in the cement 12. If the cement 12 is being strained due to subsidence or compaction, production rates can be adjusted as needed to reduce the subsidence or compaction.

One or more optical waveguides 22 are preferably installed in the well, so that they are operative to sense certain parameters of the cement 12. As depicted in FIG. 1, the optical waveguides 22 are positioned in the annulus 14 between the casing 16 and the wellbore 18, but in other examples the optical waveguides could be positioned in a wall of the casing, or adjacent the formation 20, etc.

Figure 3:
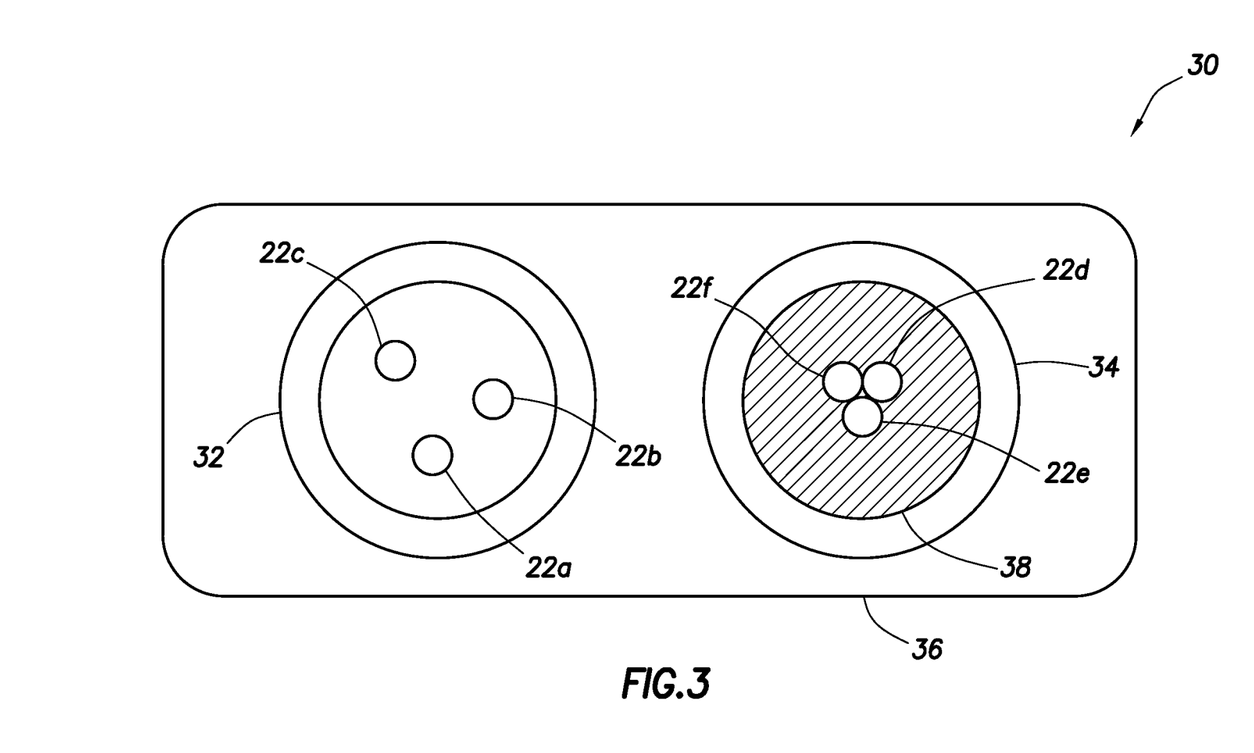
FIG. 3 is an enlarged scale schematic cross-sectional view of a waveguide assembly which may be used in the well monitoring system and method.

The optical waveguides 22 are preferably strapped, clamped or otherwise secured to an exterior of the casing 16, but other means of installing the optical waveguides may be used in other examples. The optical waveguides 22 may also be included in an overall optical waveguide assembly 30, as depicted in FIG. 3 and described below.

The optical waveguides 22 may comprise optical fibers, optical ribbons or any other type of optical waveguides. The optical waveguides 22 may comprise single mode or multi-mode waveguides, or any combination thereof.

An optical interrogation system 24 is optically connected to the optical waveguides 22 at a remote location, such as the earth's surface, a sea floor or subsea facility, etc. The optical interrogation system 24 is used to launch pulses of light into the optical waveguides 22, and to detect optical reflections and backscatter indicative of parameters of the cement 12. The optical interrogation system 24 can comprise one or more lasers, interferometers, photodetectors, optical time domain reflectometers (OTDR's) and/or other conventional optical equipment well known to those skilled in the art.

A control system 26 receives information from the optical interrogation system 24 indicative of the sensed parameters of the cement 12. The control system 26 compares this real time information to predetermined acceptable ranges for the parameters and, if a sensed parameter is outside of its acceptable range, the control system will cause a change to be made in at least one item of well equipment 28.

For example, if excessive strain is detected in the cement 12 due to high temperature fluids being produced into the wellbore 18 from the formation 20, the rate of production can be decreased until the strain is again within the acceptable range. In an injection operation, the rate of injection could be reduced as needed to maintain the strain in the cement 12 within the acceptable range.

The optical waveguides 22 can in some embodiments sense acoustic vibrations in the cement 12 due, for example, to fluid flowing through or past the cement, to the cement cracking, etc. Well operations can be changed as needed in response to the sensing of acoustic vibrations in the cement 12.

Other sensors 30 can be included in the system 10 for monitoring various parameters of the cement 12. Depicted in FIG. 1 are sensors 30 which detect hydration of the cement 12. The sensors 30 emit an acoustic signal (such as a variable frequency, chirp, etc.) which is indicative of the hydration of the cement 12.

The acoustic signals from the sensors 30 are detected by the optical waveguides 22. In this manner, the hydration of the cement 12 at various distributed locations along the annulus 14 can be monitored.

Figure 2:
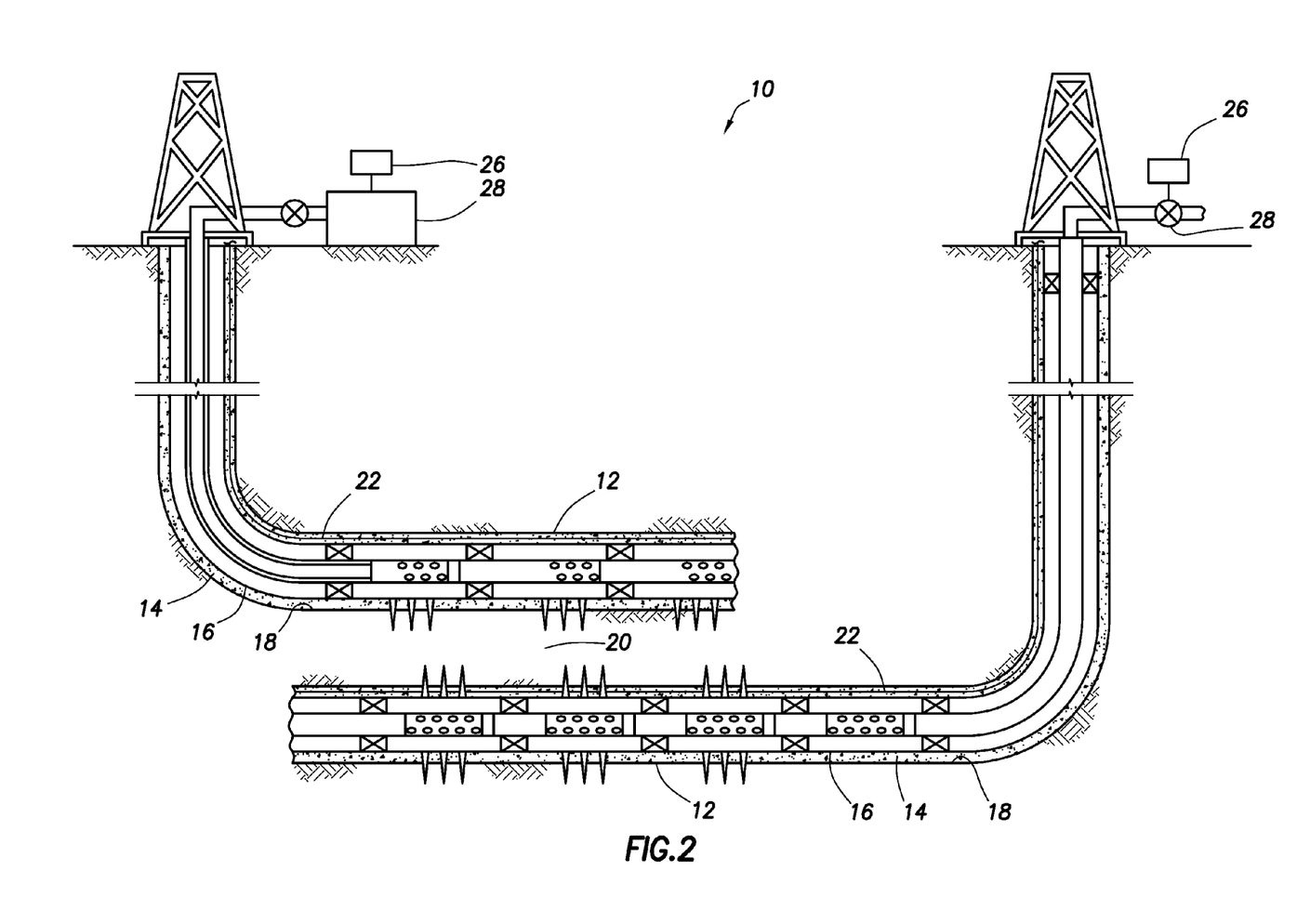
FIG. 2 is a schematic cross-sectional view of another configuration of the well system of FIG. 1.

Referring additionally now to FIG. 2, another configuration of the system 10 is representatively illustrated. In this configuration, two wells are used—one being an injection well, and the other being a production well.

The configuration of wells depicted in FIG. 2 may be of the type known to those skilled in the art as Steam Assisted Gravity Drainage (SAGD), in which steam is injected via one wellbore into the formation 20, thereby heating the hydrocarbons in the formation, and the hydrocarbons are produced via another wellbore. In FIG. 2, the upper generally horizontal wellbore is used for steam injection, and the lower generally horizontal wellbore is used for hydrocarbon production, but other arrangements, numbers and combinations of wellbores may be used in keeping with the principles of this disclosure.

The control system 26 for the injection well is depicted in FIG. 2 as being connected to the well equipment 28 which, in this example, comprises a steam production facility. Thus, the production and injection of steam into the injection well can be controlled as needed to maintain the parameters of the cement 12 in the injection well within acceptable ranges. For example, the production and/or injection of steam could be reduced if needed, in order to reduce strain in the cement 12 in the injection well.

The control system 26 for the production well is depicted in FIG. 2 as being connected to the well equipment 28 which, in this example, comprises a production control valve. Thus, the production of fluids from the formation 20 into the wellbore 18 can be controlled as needed to maintain the parameters of the cement 12 in the production well within acceptable ranges. For example, the production of fluids into the wellbore 18 could be reduced if needed, in order to reduce strain in the cement 12 in the production well.

The well monitoring system 10 preferably uses a combination of two or more distributed optical sensing techniques. These techniques can include detection of Brillouin backscatter and/or coherent Rayleigh backscatter resulting from transmission of light through the optical waveguides 22. Raman backscatter may also be detected and, if used in conjunction with detection of Brillouin backscatter, may be used for thermally calibrating the Brillouin backscatter detection data in situations where accurate strain measurements are desired.

The optical sensing techniques can be used to detect static strain, dynamic strain, acoustic vibration and/or temperature. These optical sensing techniques may be combined with any other optical sensing techniques, such as hydrogen sensing, stress sensing, etc.

Brillouin backscatter detection is preferably used to monitor static strain, with data collected at time intervals of a few seconds to hours. Most preferably Brillouin backscatter gain is detected as an indication of strain in the cement 12.

To ensure that one of the optical waveguides 22 experiences the same strain as the cement 12, the optical waveguide is preferably mechanically coupled to the cement. In this way, strain in the cement 12 is imparted to the optical waveguide.

The optical waveguides 22 could include one or more waveguides for Brillouin backscatter detection, depending on the Brillouin method used (e.g., linear spontaneous or non-linear stimulated). The Brillouin backscattering detection technique measures the natural acoustic velocity via corresponding scattered photon frequency shift in a waveguide at a given location along the waveguide.

The frequency shift is induced by changes in density of the waveguide. The density, and thus acoustic velocity, can be affected primarily by two parameters: strain and temperature.

In long term monitoring, it is expected that the temperature will remain fairly stable. If the temperature is stable, any changes monitored with a Brillouin backscattering detection technique would most likely be due to changes in strain in the cement 12. Thus, static strain measurements may be used to monitor deformation of the cement 12 over long periods of time.

In the event of sudden cement 12 failure, a sudden change in strain should be detected at the location of the failure. If self-healing cement is used, the stress in the cement should be seen changing as the healing takes place.

Preferably, however, accuracy will be improved by independently measuring strain and/or temperature, in order to calibrate the Brillouin backscatter measurements. An optical waveguide which is mechanically decoupled from the cement 12 and any other sources of strain may be used as an effective source of temperature calibration for the Brillouin backscatter strain measurements made using another mechanically coupled optical waveguide.

Coherent Rayleigh backscatter detection techniques can be used with either mechanically coupled or decoupled waveguides. Coherent Rayleigh backscatter is preferably used to monitor dynamic strain (e.g., acoustic pressure and vibration) in the cement 12.

The coherent Rayleigh backscatter detection techniques can detect stress failure events (such as cracking of the cement 12), flow noise in the annulus 14, lack of flow noise (e.g., due to healed cement or successful remedial operations to seal a previous leak).

Raman backscatter detection techniques are preferably used for monitoring distributed temperature in the cement 12. Such techniques are known to those skilled in the art as distributed temperature sensing (DTS).

Raman backscatter is relatively insensitive to distributed strain, although localized bending in a waveguide can be detected. Temperature measurements obtained using Raman backscatter detection techniques can, therefore, be used for temperature calibration of Brillouin backscatter measurements.

Distributed temperature measured using Raman backscatter detection techniques can be used to monitor the temperature of the cement 12 itself. In addition, the temperature measurements can be used to detect fluid flow through or past the cement 12 (for example, through cracks in the cement, or between the cement and the casing 16 or formation 20).

Raman light scattering is caused by thermally influenced molecular vibrations. Consequently, the backscattered light carries the local temperature information at the point where the scattering occurred.

The amplitude of an Anti-Stokes component is strongly temperature dependent, whereas the amplitude of a Stokes component of the backscattered light is not. Raman backscatter sensing requires some optical-domain filtering to isolate the relevant optical frequency (or optical wavelength) components, and is based on the recording and computation of the ratio between Anti-Stokes and Stokes amplitude, which contains the temperature information.

Since the magnitude of the spontaneous Raman backscattered light is quite low (e.g., 10 dB less than Brillouin backscattering), high numerical aperture (high NA) multi-mode optical waveguides are typically used, in order to maximize the guided intensity of the backscattered light. However, the relatively high attenuation characteristics of highly doped, high NA, graded index multi-mode waveguides, in particular, limit the range of Raman-based systems to approximately 10 km.

Brillouin light scattering occurs as a result of interaction between the propagating optical signal and thermally excited acoustic waves (e.g., within the GHz range) present in silica optical material. This gives rise to frequency shifted components in the optical domain, and can be seen as the diffraction of light on a dynamic in situ "virtual" optical grating generated by an acoustic wave within the optical media. Note that an acoustic wave is actually a pressure wave which introduces a modulation of the index of refraction via the elasto-optic effect.

The diffracted light experiences a Doppler shift, since the grating propagates at the acoustic velocity in the optical media. The acoustic velocity is directly related to the silica media density, which is temperature and strain dependent. As a result, the so-called Brillouin frequency shift carries with it information about the local temperature and strain of the optical media.

Note that Raman and Brillouin scattering effects are associated with different dynamic non-homogeneities in silica optical media and, therefore, have completely different spectral characteristics.

Coherent Rayleigh light scattering is also caused by fluctuations or non-homogeneities in silica optical media density, but this form of scattering is purely "elastic." In contrast, both Raman and Brillouin scattering effects are "inelastic," in that "new" light or photons are generated from the propagation of the laser probe light through the media.

In the case of coherent Rayleigh light scattering, temperature or strain changes are identical to an optical source (e.g., very coherent laser) wavelength change. Unlike conventional Rayleigh backscatter detection techniques (using common optical time domain reflectometers), because of the extremely narrow spectral width of the laser source (with associated long coherence length and time), coherent Rayleigh (or phase Rayleigh) backscatter signals experience optical phase sensitivity resulting from coherent addition of amplitudes of the light backscattered from different parts of the optical media which arrive simultaneously at a photodetector.

Referring additionally now to FIG. 3, an enlarged scale cross-sectional view of an optical waveguide assembly 30 which may be used in the well monitoring system 10 is representatively illustrated. The assembly 30 preferably contains and protects the optical waveguides 22 (depicted in FIG. 3 as optical waveguides 22a-f). Although six of the optical waveguides 22a-f are depicted in FIG. 3, any number, type, combination or arrangement of optical waveguides may be used in keeping with the principles of this disclosure.

As representatively illustrated in FIG. 3, the waveguides 22a-c are loosely contained within a tube 32, and the waveguides 22d-f are secured within another tube 34. The tubes 32, 34 could be approximately 63 mm diameter stainless tubes of the type known to those skilled in the art as control line, but it should be understood that use of the tubes is not necessary, since the waveguides 22a-c could be loosely contained within the assembly 30 and the waveguides 22d-f could be secured in the assembly without use of one or both of the tubes.

The waveguide 22a is preferably used for distributed hydrogen sensing, waveguide 22b is preferably used for distributed acoustic sensing, and waveguide 22c is preferably used for distributed temperature sensing. Since in this example it is not desired for any of the waveguides 22a-c to have strain in the cement 12 imparted to the waveguide, the waveguides are loosely contained in the assembly 30, so that an outer enclosure 36 of the assembly can experience strain, without that strain being transmitted to the waveguides. Thus, the waveguides 22a-c are mechanically decoupled from strain in the assembly 30.

The waveguides 22d-f are preferably used for distributed strain sensing. Since in this example it is desired for the waveguides 22d-f to have strain in the cement 12 imparted to the waveguides, they are secured in the assembly 30 in a manner which transmits strain to the waveguides. For example, the waveguides 22d-f may be encapsulated in epoxy or another bonding agent 38, molded within the enclosure 36 if the tube 34 is not used, etc. Thus, the waveguides 22d-f are mechanically coupled to strain in the assembly 30.

Figure 4:
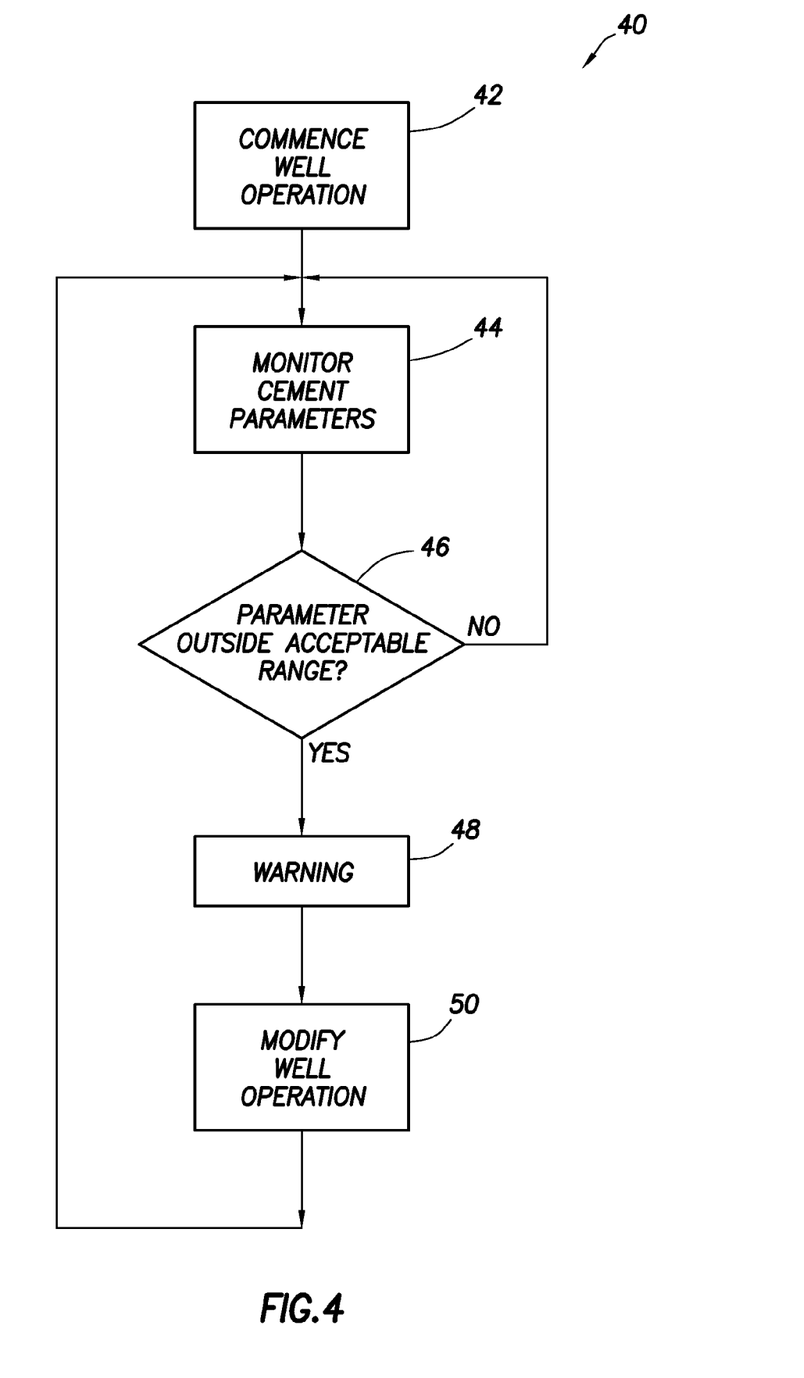
FIG. 4 is a schematic flowchart representing the method.

Referring additionally now to FIG. 4, a method 40 of controlling a well operation is representatively illustrated in flowchart form. The method 40 may be used with the well monitoring system 10 described above, or the method may be used with any other system in keeping with the principles of this disclosure.

In step 42 of the method 40, a well operation is commenced. The well operation may be any type of well operation, such as an injection, stimulation, production, completion, testing, cementing or other type of operation. At this point, the optical waveguides 22 are preferably already installed in the wellbore 18 (for example, in the annulus 14 between the casing 16 and the formation 20).

In step 44, parameters of the cement 12 are monitored using the optical waveguides 22 and the optical interrogation system 24. As discussed above, the parameters can include any of dynamic strain, static strain, stress, temperature, acoustic vibrations, hydration, etc. Various optical techniques described above may be used for monitoring the parameters of the cement 12, and any one or combination of those techniques may be used in the method 40 in keeping with the principles of this disclosure.

In step 46 an evaluation is made whether any parameter monitored in step 44 is outside of an acceptable range. This evaluation may be made by the control system 26, and can involve a comparison between each real time measured parameter and a respective acceptable range for that parameter (for example, as input by an operator). The acceptable range may comprise a maximum or minimum threshold, in which case the acceptable range would be respectively below or above such threshold.

If a parameter is outside of its acceptable range, then the control system 26 provides a warning in step 48. This warning could take any form, such as an alert on a display screen, a warning message sent to a remote location, an alarm, etc.

In step 50, the well operation is modified in order to bring the parameter back into the acceptable range, or at least to prevent any damage (or further damage) to the cement 12. As described above, the control system 26 can make adjustments to certain well equipment 28 in order to accomplish this objective. Preferably, this modification of the well operation is automatic, but some human intervention may be used, if desired.

After the well operation has been modified in step 50, or if the parameters are found to be within their acceptable ranges in step 46, the method 40 returns to the step 44 of monitoring the cement parameters. Thus, it will be appreciated that the cement parameters are continually, or at least periodically, monitored to ensure that the parameters are maintained within their acceptable ranges, or that, if a parameter has been detected outside of its acceptable range, the modification to the well operation in step 50 has been successful.

Importantly, the method 40 is closed loop, in that it responds continually, or at least periodically, to changes in the parameters and modifies the well operation as needed to maintain the parameters within their respective acceptable ranges. Thus, damage to the cement 12 can be avoided (or at least minimized) by proactive modification of the well operation as needed.

Referring additionally now to FIGS. 5A-8D, various arrangements of the optical waveguides 22 with respect to the casing 16 are representatively illustrated, apart from the remainder of the system 10. Although the cement 12 is not depicted in FIGS. 5A-8D, it should be understood that the optical waveguides 22 in these examples are preferably exposed to the cement in the annulus 14, for example, as illustrated in FIGS. 1 & 2.

Figure 5A:
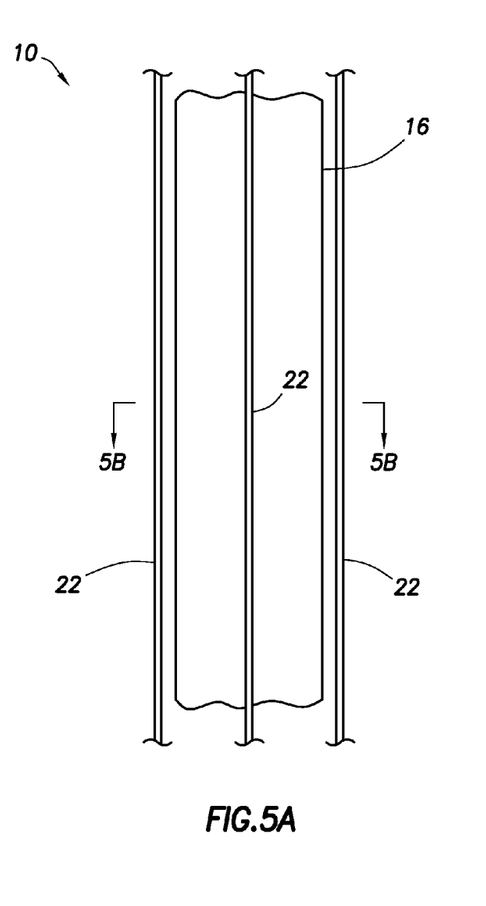
Figure 5B:
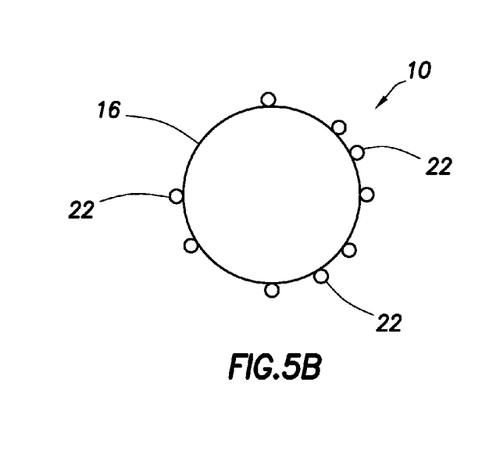

In FIGS. 5A & B, the optical waveguides 22 extend linearly along the exterior of the casing 16. In FIG. 5A, the waveguides 22 are spaced apart by 90 degrees about the casing 16. In FIG. 5B, additional waveguides 22 are included, spaced apart by 45, 60 and 120 degrees. Any spacing of the waveguides 22 may be used in keeping with the principles of this disclosure.

Figure 6A:
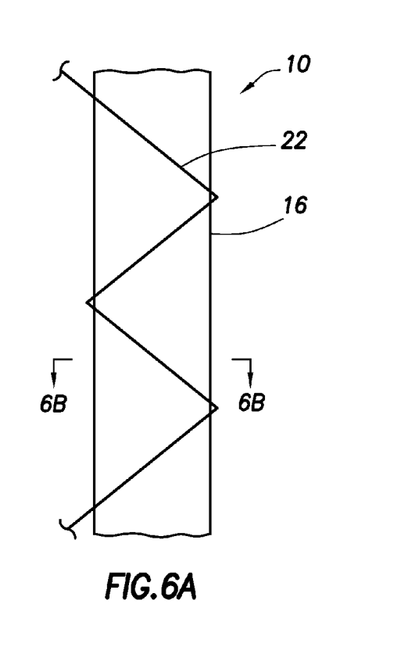
Figures 6B, 6D:
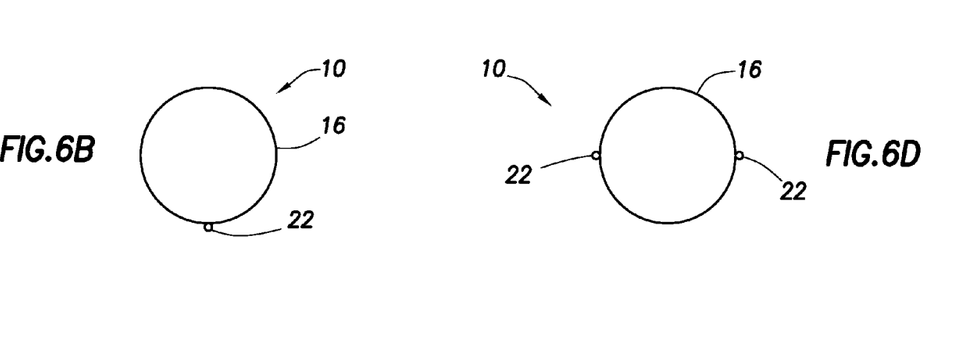

In FIGS. 6A & B, an optical waveguide 22 is "zig-zagged" across the exterior of the casing 16, by back and forth wrapping of the waveguide between 0 and 180 degrees about the casing. This technique can increase spatial resolution along the waveguide 22 (e.g., by increasing the length of the waveguide relative to the length of the casing 16), and can provide for common mode rejection.

Figure 6C:
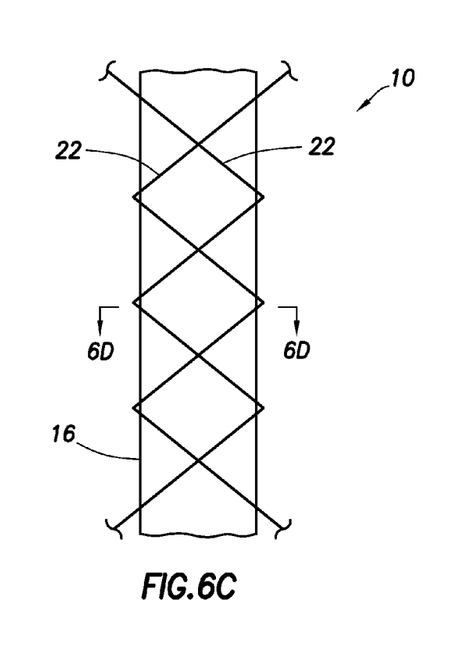

In FIGS. 6C & D, multiple waveguides 22 are "zig-zagged" across the exterior of the casing 16. Although 0 to 180 degrees of back and forth wrapping of the waveguides 22 is depicted in FIGS. 6A-D, any amount of back and forth wrapping and any number of optical waveguides may be used in keeping with the principles of this disclosure.

Figure 7A:
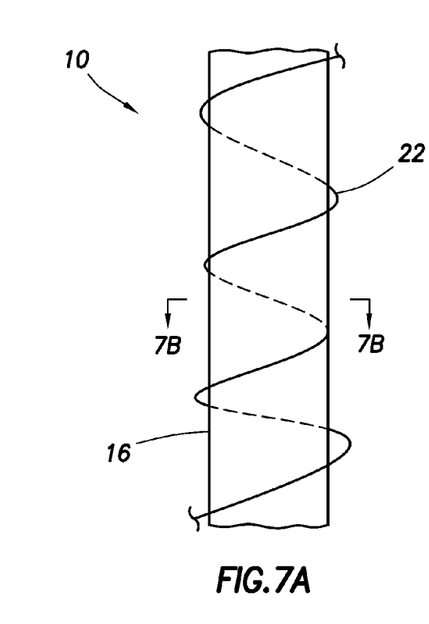
Figure 7B:
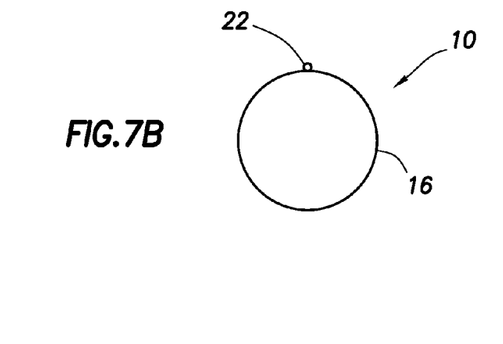

In FIGS. 7A & B, an optical waveguide 22 is wrapped helically about the exterior of the casing 16. As with the examples of FIGS. 6A-D, this technique can increase spatial resolution along the waveguide 22 (e.g., by increasing the length of the waveguide relative to the length of the casing 16), and can provide for common mode rejection.

Figure 7C:
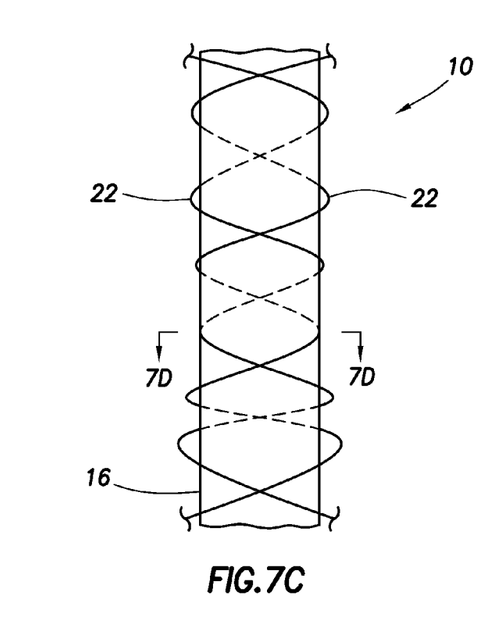
Figure 7D:
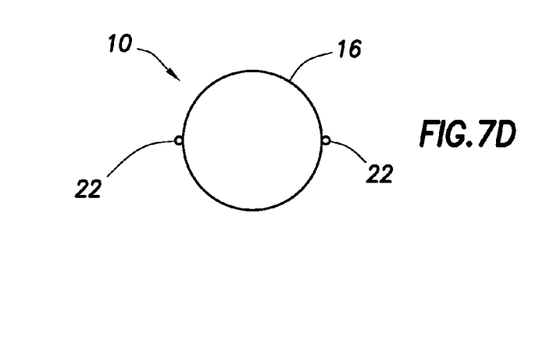

In FIGS. 7C & D, multiple waveguides 22 are wrapped helically about the exterior of the casing 16. Although only two waveguides 22 are depicted in FIGS. 7C & D, any number of optical waveguides may be used in keeping with the principles of this disclosure.

Figure 8A:
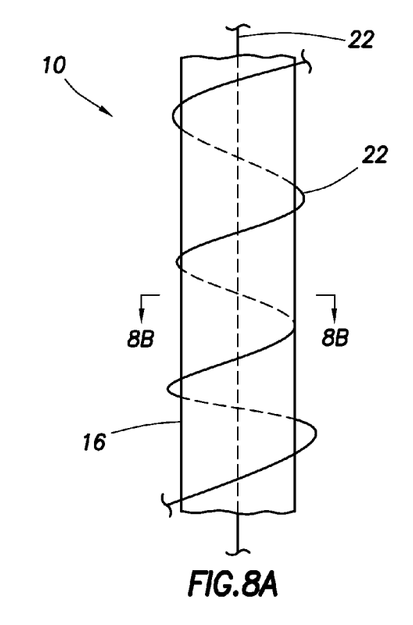
Figure 8B:
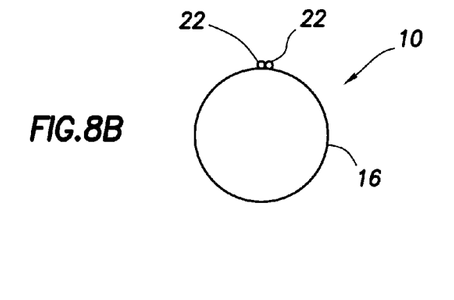

In FIGS. 8A & B, an optical waveguide 22 is wrapped helically about the exterior of the casing 16, and another optical waveguide extends linearly along the casing. In this example, the helically wrapped waveguide 22 may be used for distributed strain and temperature sensing, and the linearly extending waveguide may provide for separate distributed temperature sensing.

Figure 8C:
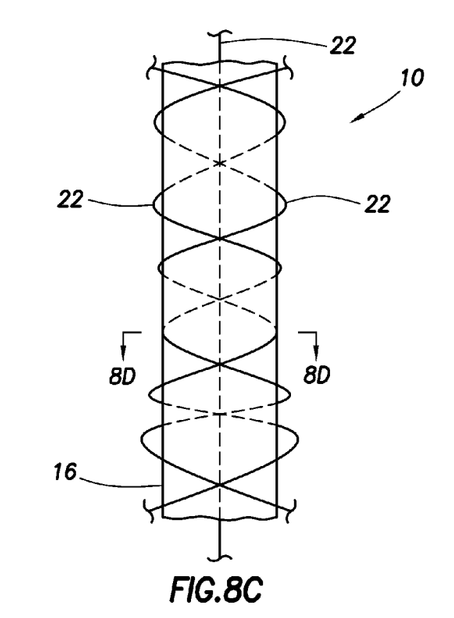
Figure 8D:
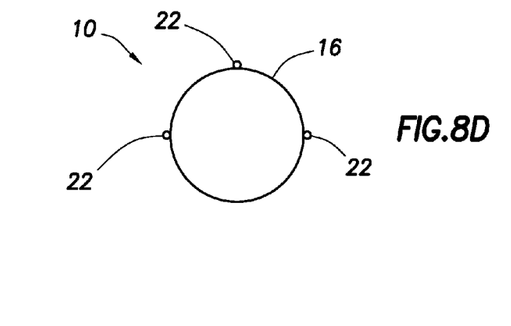

In FIGS. 8C & D, a configuration similar to that in FIGS. 8A & B is used, except that multiple waveguides 22 are wrapped helically about the exterior of the casing 16. The helically wrapped waveguides 22 are wrapped in opposite directions to provide for common mode rejection.

In each of the configurations described above, the optical waveguides 22 may be included in an assembly 30, such as that depicted in FIG. 3. However, other types of waveguide assemblies, and assemblies including any number of waveguides 22 (including one), may be used in keeping with the principles of this disclosure.

Although only a few specific well operations which can benefit from the principles of this disclosure have been described in detail above, it will be appreciated that a wide variety of well operations not described above could also benefit from those principles. Additional well operations are discussed briefly below, but it should be clearly understood that the principles of this disclosure are not limited to only the specific well operations described herein.

The principles of this disclosure may be used to monitor and minimize cement sheath damage during well completion operations. Often, significant loads are exerted upon the casing 16 and the set cement 12 that surrounds it during well completion operations.

These loads may occur, for example, when displacing a heavy weight drilling fluid from inside the casing 16 that was used for well control purposes, with a lighter weight completion fluid. Any density difference between these two fluids will reduce the pressure differential on the casing 16 and cement 12 by Ph, where Ph in psi=0.05195×(higher−lower density in pounds per gallon)×height of fluid column. If strain in the cement 12 is above an acceptable range, then the completion fluid density can be modified to prevent damage to the cement.

In another example, a well may be treated with high pressure fracture stimulation during completion operations. The pressures used in stimulation operations can potentially be significant. These pressures have been documented as causes of cement 12 stress failure.

The principles of this disclosure provide for the health of the cement 12 to be monitored during these operations, and for the well completion operations to be altered as necessary before failure of the cement sheath may occur. For example, the well equipment 28 can include a pump used to pump stimulation fluids into the well, and the pump rate can be modified during the stimulation operation (if the strain in the cement is above an acceptable range) to maintain the stress on the cement 12 below a predetermined level.

The principles of this disclosure can be used to monitor and minimize cement 12 damage during thermal well cycling operations. When operating thermal wells, such as those producing geothermal energy, or those into which steam is injected for heavy oil recovery, it is often necessary to subject the wells to thermal cycles.

The nature of cement is that often it can only withstand a certain number of cycles, before an initially competent cement sheath may fail. The principles of this disclosure permit the health of the cement 12 to be monitored during thermal well cycling operations, and for the well operations to be altered as necessary before failure of the cement occurs. For example, when the onset of cement 12 stress failure is detected it may be possible to start operating the well at steady state conditions instead of thermally cycling the well.

The principles of this disclosure may be used to monitor the annular cement sheath integrity of storage and disposal wells for assurance purposes. It is critical to maintain an annular seal in gas storage and disposal wells. CO2 injection wells are also another class of well where long term cement sheath integrity is an important issue.

The principles described herein provide for the health of the cement 12 in these wells to be monitored in real time, and for well operators to take remedial action in the event that the onset of failure is noted, prior to that failure occurring. For example, it may be possible to cease active use of such wells to reduce the stress prior to damage occurring to the cement 12.

The principles of this disclosure provide for monitoring the cement 12 to detect an impending collision during template well construction operations, and to modify drilling operations in order to avoid such collisions. Often operators will construct a number of wells from the same surface template or with the conductor casings placed close together. In these cases, during the initial portion of well construction, especially if other wells in the template or area are actively being produced, the potential for the drill bit to accidently collide with an existing producing well exists.

Such a collision could prove hazardous to health, safety and the environment if it was to occur. The present disclosure provides for the health of the cement 12 in existing wells to be monitored as a new well is being drilled, and for any impending collision with a monitored cement sheath to be detected in real time and any necessary remedial action taken by those drilling the new wellbore.

This disclosure also provides for monitoring a cement sheath set through massive salt formations for detection of the onset of point loading. When constructing a well through massive salt sections such as those found in the North Sea, Brazil and the Gulf of Mexico, operators can be presented with the potential hazard of flowing salts. If an irregularly shaped wellbore 18 is drilled and the annulus 14 between this irregular wellbore and casing 16 is not completely filled with a cement 12 that develops compressive strength in a timely manner, then a potential exists for the flowing salt to point load the casing and collapse it.

The present disclosure provides for the health of the cement 12 in such wells to be monitored, and the onset of such point loading to be detected in real time and for remedial action to be taken. Such remedial action may include, for example, the running and cementing of a heavy wall scab liner over the affected section.

The principles of this disclosure also provide for monitoring the annulus 14 of subsea wells for annular pressure build up. With subsea wells, the build up of pressure caused by the heating of trapped fluid in the annulus 14 of these wells, can sometimes prove to be catastrophic.

The build up of pressure can be enough to exceed casing 16 collapse or burst limits. The principles described herein allow for the health of the cement 12 in such wells to be monitored, and for the onset of such annular pressure build up to be detected prior to failure limits being reached, so that remedial measures can be timely taken.

It may now be fully appreciated that the above disclosure provides several advancements to the art of controlling well operations and mitigating damage to cement in a well. The system 10 and associated method 40 provide for monitoring parameters of the cement 12 and modifying a well operation when a parameter is outside an acceptable range for the parameter.

In particular, the above disclosure describes a method 40 of controlling a well operation. The method 40 can include monitoring at least one parameter of cement 12 lining a wellbore 18, with the monitoring being performed via at least one optical waveguide 22. The well operation is modified in response to the parameter being outside of a predetermined acceptable range.

An optical interrogation system 24 may detect Brillouin backscatter gain and/or coherent Rayleigh backscatter resulting from light transmitted through the optical waveguide 22.

The at least one optical waveguide 22 may comprise at least first and second optical waveguides 22*d,c*. Strain in the cement 12 is imparted to the first optical waveguide 22*d*, and the second optical waveguide 22*c* is isolated from the strain in the cement 12. The second optical waveguide 22*c* may sense temperature of the cement 12.

The optical interrogation system 24 may detect Brillouin backscatter gain resulting from light transmitted through the first optical waveguide 22*d*, and the optical interrogation system 24 may detect Raman backscatter resulting from light transmitted through the second optical waveguide 22*c*.

The optical interrogation system 24 may detect coherent Rayleigh backscatter resulting from light transmitted through the first optical waveguide 22*d*, and the optical interrogation system 24 may detect Raman backscatter resulting from light transmitted through the second optical waveguide 22*c*.

The step of modifying the well operation can include changing a rate of production into the wellbore 18, changing a rate of fluid flow into a formation 20 surrounding the wellbore 18, modifying a density of a fluid circulated into the wellbore 18, modifying a pump rate of a stimulation fluid, modifying a thermal cycling operation, modifying a drilling operation (thereby avoiding a collision with the wellbore 18), and/or relieving pressure build up in an annulus 14.

The step of monitoring the at least one parameter can include detecting at least one of strain, stress and temperature, detecting hydration of the cement 12, detecting acoustic vibrations in the cement 12, detecting compression of the cement 12 and/or detecting point loading of casing 16.

Also described by the above disclosure is a well monitoring system 10. The system 10 can include at least one optical waveguide 22 which is used to sense at least one parameter of cement 12 lining a wellbore 18. An optical interrogation system 24 is optically connected to the at least one optical waveguide 22. A control system 26 controls operation of at least one item of well equipment 28 in response to information received from the optical interrogation system 24.

Operation of the well equipment 28 may be changed by the control system 26 in response to the parameter being outside of a predetermined acceptable range.

The well equipment 28 may regulate a rate of production into the wellbore 18, and/or a rate of fluid flow into a formation 20 surrounding the wellbore 18.

It is to be understood that the various examples described above may be utilized in various orientations, such as inclined, inverted, horizontal, vertical, etc., and in various configurations, without departing from the principles of the present disclosure. The embodiments illustrated in the drawings are depicted and described merely as examples of useful applications of the principles of the disclosure, which are not limited to any specific details of these embodiments.

In the above description of the representative examples of the disclosure, directional terms, such as "above," "below," "upper," "lower," etc., are used only for convenience in referring to the accompanying drawings.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of the present disclosure. Accordingly, the foregoing detailed description is to be clearly understood as being given by way of illustration and example only, the spirit and scope of the present invention being limited solely by the appended claims and their equivalents.

What is claimed is:

1. A method of controlling a well operation, the method comprising:
    monitoring in real-time at least one parameter of cement lining a wellbore, wherein at least one optical waveguide senses the parameter; and
    automatically modifying the well operation in response to the parameter being outside of a predetermined acceptable range, thereby minimizing damage to the wellbore.

2. The method of claim 1, wherein an optical interrogation system detects distributed transient acoustic events through distributed dynamic electromagnetic interferometry resulting from light transmitted through the optical waveguide.

3. The method of claim 1, wherein modifying the well operation further comprises changing a rate of production into the wellbore.

4. The method of claim 1, wherein modifying the well operation further comprises changing a rate of fluid flow into a formation surrounding the wellbore.

5. The method of claim 1, wherein monitoring the at least one parameter further comprises detecting at least one of strain, stress and temperature.

6. The method of claim 1, wherein monitoring the at least one parameter further comprises detecting hydration of the cement.

7. The method of claim 1, wherein monitoring the at least one parameter further comprises detecting acoustic vibrations in the cement.

8. The method of claim 1, wherein monitoring the at least one parameter further comprises detecting compression of the cement.

9. The method of claim 1, wherein modifying the well operation further comprises modifying a density of a fluid circulated into the wellbore.

10. The method of claim 1, wherein modifying the well operation further comprises modifying a pump rate of a stimulation fluid.

11. The method of claim 1, wherein modifying the well operation further comprises modifying a thermal cycling operation.

12. The method of claim 1, wherein modifying the well operation further comprises modifying a drilling operation, thereby avoiding a collision between the wellbore and another wellbore being drilled.

13. The method of claim 1, wherein monitoring the at least one parameter further comprises detecting at least one of a localized strain and a point loading of casing.

14. The method of claim 1, wherein modifying the well operation further comprises relieving pressure build up in an annulus.

15. A method of controlling a well operation, the method comprising:
    sensing at least one parameter of cement lining a wellbore in real-time, the sensing being performed via at least one optical waveguide; and
    modifying the well operation in direct response to the parameter being outside of a predetermined acceptable range, thereby automatically minimizing damage to integrity of the wellbore, wherein an optical interrogation system detects Brillouin backscatter gain resulting from light transmitted through the optical waveguide.

16. A method of controlling a well operation, the method comprising:
    monitoring at least one parameter of cement lining a wellbore, the monitoring being performed via at least first and second optical waveguides; and
    modifying the well operation in response to the parameter being outside of a predetermined acceptable range, wherein strain in the cement is imparted to the first optical waveguide, and wherein the second optical waveguide is isolated from the strain in the cement.

17. The method of claim 16, wherein the second optical waveguide senses temperature of the cement.

18. A method of controlling a well operation, the method comprising:
    monitoring at least one parameter of cement lining a wellbore, the monitoring being performed via at least first and second optical waveguides; and
    modifying the well operation in response to the parameter being outside of a predetermined acceptable range, wherein an optical interrogation system detects Brillouin backscatter gain resulting from light transmitted through the first optical waveguide, and wherein the optical interrogation system detects Raman backscatter resulting from light transmitted through the second optical waveguide.

19. A method of controlling a well operation, the method comprising:
    monitoring at least one parameter of cement lining a wellbore, the monitoring being performed via at least first and second optical waveguides; and
    modifying the well operation in response to the parameter being outside of a predetermined acceptable range, wherein an optical interrogation system detects coherent Rayleigh backscatter resulting from light transmitted through the first optical waveguide, and wherein the optical interrogation system detects Raman backscatter resulting from light transmitted through the second optical waveguide.

20. A well monitoring system, comprising:

at least one optical waveguide which senses at least one physical parameter of cement lining a wellbore in real-time;

an optical interrogation system optically connected to the at least one optical waveguide; and a control system which controls operation of well equipment in direct response to the sensed parameter received from the optical interrogation system, whereby damage to the cement is automatically minimized.

21. The well monitoring system of claim 20, wherein operation of the well equipment is changed by the control system in response to the parameter being outside of a predetermined acceptable range.

22. The well monitoring system of claim 20, wherein the optical interrogation system detects Brillouin backscatter gain resulting from light transmitted through the optical waveguide.

23. The well monitoring system of claim 20, wherein the optical interrogation system detects coherent Rayleigh backscatter resulting from light transmitted through the optical waveguide.

24. The well monitoring system of claim 20, wherein the well equipment regulates a rate of production into the wellbore.

25. The well monitoring system of claim 20, wherein the well equipment regulates a rate of fluid flow into a formation surrounding the wellbore.

26. The well monitoring system of claim 20, wherein the at least one parameter comprises at least one of strain, stress and temperature.

27. The well monitoring system of claim 20, wherein the at least one parameter comprises hydration of the cement.

28. The well monitoring system of claim 20, wherein the at least one parameter comprises acoustic vibration in the cement.

29. The well monitoring system of claim 20, wherein the at least one parameter comprises compression of the cement.

30. A well monitoring system, comprising:

at least first and second optical waveguides which sense at least one parameter of cement lining a wellbore;

an optical interrogation system optically connected to the at least first and second optical waveguides; and a control system which controls operation of well equipment in response to information received from the optical interrogation system, wherein strain in the cement is imparted to the first optical waveguide, and wherein the second optical waveguide is isolated from the strain in the cement.

31. The well monitoring system of claim 30, wherein the second optical waveguide senses temperature of the cement.

32. A well monitoring system, comprising:

at least first and second optical waveguides which sense at least one parameter of cement lining a wellbore;

an optical interrogation system optically connected to the at least first and second optical waveguides; and a control system which controls operation of well equipment in response to information received from the optical interrogation system, wherein the optical interrogation system detects Brillouin backscatter gain resulting from light transmitted through the first optical waveguide, and wherein the optical interrogation system detects Raman backscatter resulting from light transmitted through the second optical waveguide.

33. A well monitoring system, comprising:

at least first and second optical waveguides which sense at least one parameter of cement lining a wellbore;

an optical interrogation system optically connected to the at least first and second optical waveguides; and a control system which controls operation of well equipment in response to information received from the optical interrogation system, wherein the optical interrogation system detects coherent Rayleigh backscatter resulting from light transmitted through the first optical waveguide, and wherein the optical interrogation system detects Raman backscatter resulting from light transmitted through the second optical waveguide.

* * * * *